United States Patent Office 3,657,302
Patented Apr. 18, 1972

3,657,302
PROCESS FOR THE PREPARATION OF ORGANO-SILICON COMPOUNDS HAVING HYDROGEN DIRECTLY BONDED TO SILICON
Norbert Duffaut, Barsac, Jacques Dunogues, Talence, Raymond Calas, Le Bouscat, and Gilbert Marin, Sainte-Foy-les-Lyon, France, assignors to Rhone-Poulenc S.A., Paris, France
No Drawing. Filed June 12, 1970, Ser. No. 45,934
Claims priority, application France, June 16, 1969, 6919961; July 17, 1969, 6924384
Int. Cl. C07f 7/02
U.S. Cl. 260—448.2 E          10 Claims

ABSTRACT OF THE DISCLOSURE

Organosilicon compounds containing silicon bonded to hydrogen are made by reacting organosilicon compounds containing silicon bonded to chlorine with hydrogen chloride, free or combined, and magnesium or aluminium, in the presence of a hexaalkylphosphotriamide.

---

The present invention relates to the preparation of organosilicon compounds having hydrogen bonded to silicon compounds having hydrogen bonded to silicon from organosilicon compounds having chlorine bonded to silicon.

It is known that the chlorosilanes can be converted into hydrogenosilanes by the action of lithium aluminium hydride, or, in certain cases, by the action of lithium hydride. Thus, for example, Finholt et al have prepared diethyldihydrogenosilane and ethylitrihydrogenosilane (J. Amer. Chem. Soc. 69, 2692 (1947)). Zakharkin has also prepared hydrogenosilanes from chlorosilanes using a mixture of sodium hydride and triethylaluminium (Izvest Akad. Nauk SSSR 1960, 2244–5, cf. Chemical Abstracts 55, 14341b). Such reactions give good yields, but cannot be utilised on an industrial scale because of the high price of the reducing agent.

The present invention provides a process for the preparation of organosilicon compounds containing silicon-bonded to hydrogen, which comprises reacting, in a hexaalkylphosphotriamide, an organosilicon compound containing silicon bonded to chlorine, with hydrogen chloride, in the free state or combined in the form of ammonium chloride or an amine hydrochloride, and magnesium or aluminium.

While the invention does not depend on the truth of this explanation, it is believed that the reaction which takes place can be represented as follows:

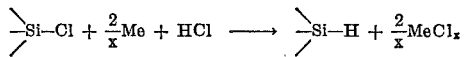

or

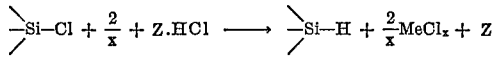

where Z represents ammonia or an amine, Me represents magnesium or aluminium, and $x$ represents the valency of the metal Me.

The process of the invention is particularly applicable to the organochlorosilanes of the formula:

$$R_{(4-n)}SiCl_n \qquad (I)$$

in which R represents an aliphatic or cycloaliphatic, monovalent organic group which may be saturated or possess one or more ethylenic unsaturations, an aryl group, an aralkyl group, an alkoxy group, or a cycloalkoxy group; and $n$ is 1, 2 or 3.

The invention is especially useful in connection with the chlorosilanes of Formula I in which R represents a straight or branched alkyl or alkenyl group of up to 6 carbon atoms, a cycloalkyl or cycloalkenyl group of 5 or 6 carbon atoms in the ring, a phenyl, alkylphenyl or phenylalkyl group, an alkoxy group of 1 to 6 carbon atoms, a cyclopentyloxy or cyclohexyloxy group, or a phenoxy group which is unsubstituted or substituted by straight or branched alkyl radicals of 1 to 6 carbon atoms each.

By way of illustration, the following are examples of compounds of Formula I: trimethylchlorosilane, tripropylchlorosilane, dimethylvinylchlorosilane, dimethylphenylchlorosilane, methyl-diphenylchlorosilane, triphenylchlorosilane, diphenyldichlorosilane, methylvinyldichlorosilane, methyltrichlorosilane, phenyltrichlorosilane, dimethylbutoxychlorosilane, and dimethylcyclohexyloxychlorosilane.

The new process makes it possible to replace all the chlorine atoms bonded to silicon by hydrogen atoms.

The magnesium and the aluminium are used in an amount which varies with the number of chlorine atoms bonded to silicon. In general 0.5 to 10 atoms, preferably 1 to 6 atoms, of metal are employed for each chlorine atom bonded to silicon which is to be replaced by hydrogen.

Aluminium is very often covered by a very thin film of oxide. In this case it is desirable, and may be, from a practical standpoint, necessary, to use a small amount of mercuric chloride to clean the surface of the metal and thus promote the reaction. The preferred amount of mercuric chloride is from 0.1 to 2% by weight of the aluminium introduced.

The hydrogen chloride can be in the free state or combined in the form of ammonium chloride or an amine hydrochloride. The amine can be primary, secondary or tertiary, aliphatic, cycloaliphatic, aromatic or aralkyl, but it must, of course, be inert, i.e. it must not interfere with the reaction. More particularly, an amine of the formula:

can be used, in which the radicals $R_1$, $R_2$ and $R_3$, which may be identical or different, each represent a hydrogen atom or a straight or branched alkyl or alkenyl radical of up to 6 carbon atoms, a cycloaliphatic radical of 5 or 6 carbon atoms in the ring, a phenylalkyl radical or an alkylphenyl radical. Furthermore, two of these radicals can be joined together to form an azacycloaliphatic ring with the nitrogen atom.

The hydrogen chloride, ammonium chloride, or amine hydrochloride is used in amount such that the ratio Mols of hydrogen chloride, ammonium chloride, or amine hydrochloride
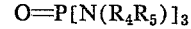
$n$ where $n$ represents the number of chlorine atoms bonded to silicon, is generally between 1 and 10, and preferably from 1.1 to 6.

In the new process, it is possible simultaneously to use ammonium chloride or an amine hydrochloride and free hydrogen chloride. It is for example possible to introduce a small amount of ammonium or amine hydrochloride with free hydrogen chloride.

The hexaalkylphosphotriamides, which are the reaction medium for the reaction of the invention, possess the general formula:

$$O{=}P[N(R_4R_5)]_3$$

in which $R_4$ and $R_5$, which may be identical or different, each represent straight or branched alkyl radicals of 1 to 4 carbon atoms. Hexamethylphosphotriamide is generally used for reasons of simplicity.

The amount of hexaalkylphosphotriamide employed can vary within wide limits, but is usually from 0.5 to 10, and preferably from 1 to 5, times the total weight of the reagents.

The reaction can be carried out at temperatures between 0° and 150° C. and preferbaly from 20° to 120° C.

In practice the following procedure is adopted: the hexaalkylphosphotriamide, the magnesium or the aluminium and, where required, the mercuric chloride, and the hydrogen chloride or the ammonium or amine hydrochloride are introduced into the reaction flask. The reagents are heated to the reaction temperature and the organosilicon compound containing chlorine bonded to silicon is gradually added, the process being carried out with stirring and with the temperature being kept constant.

According to a variant of the process, it is also possible to bubble a stream of hydrogen chloride into the reaction mixture consisting of the organosilicon compound containing chlorine bonded to silicon, hexaalkylphosphotriamide, magnesium or aluminium, optionally with mercuric chloride, and optionally ammonia or an amine. If the organosilicon compound containing hydrogen bonded to silicon which is produced in the reaction is volatile under the working conditions, which is the case for a large number of hydrogenosilanes derived from chlorosilanes of Formula I, this compound is in part evolved during the reaction and condensed in traps cooled to a low temperature. The part which has not been evolved during the reaction can be isolated by carrying out a supplementary separation at the end of the reaction, for example by bubbling through nitrogen, and collecting the hydrogenosilane in the traps provided for this purpose. The hydrogenosilane collected in the traps can then be purified by any known means. In practice it is sufficient for the hydrogenosilane, before condensation, to be brought into contact with an aqueous solution containing a very small amount of hydrochloric acid.

Silicon compounds containing hydrogen bonded to silicon are of great industrial importance. They can be added to acetylenic hydrocarbons to yield ethylenic organosilicon compounds which are used in polymerisation reactions. They can also be converted by a dehydro-condensation reaction into corresponding silicon-containing compounds. Furthermore, the hydrogenosilanes can be converted into halogenohydrogenosilanes by redistribution reactions. The halogenohydrogenosilanes allow polysiloxane compounds to be obtained containing hydrogen bonded to silicon.

The examples which follow illustrate the invention.

EXAMPLE 1

100 ml. of hexamethylphosphotriamide, 4.86 g. of magnesium and 28.7 g. of trimethylamine hydrochloride are successively introduced into a 500 cm.$^3$ flask provided with a stirrer, a dropping funnel and a reflux condenser followed by a bubble counter and connected to a water jar. 10.9 g. of trimethylchlorosilane are run into this mixture over the course of 2 or 3 minutes and the reagents are heated to about 50–60° C. A considerable evolution of gas is then observed, while the temperature rises rapidly. This temperature is maintained at about 75–80° C. for the duration of the evolution of gas (1 hour). When the evolution of gas has ceased, stirring is continued for 2 hours and the apparatus is then flushed with a stream of nitrogen, the gases being collected under the water jar. The gases pass through water bubblers containing a very small amount of hydrochloric acid and then through a series of condensers cooled to −80° C. 5.55 g. of pure trimethylsilane are thus collected, identified by infra-red analysis and gas phase chromatography. The yield of trimethylsilane is 75%.

EXAMPLE 2

Following the procedure of Example 1 but with only 2.43 g. of magnesium and 9.57 g. of trimethylamine hydrochloride, 4.45 g. of trimethylsilane are obtained.

EXAMPLE 3

Example 1 is repeated, replacing the trimethylamine hydrochloride by 16.05 g. of ammonium chloride. Trimethylsilane is obtained in a yield of 50%.

EXAMPLE 4

The procedure of Example 1 is followed, replacing the trimethylamine hydrochloride by bubbling through hydrogen chloride (flow rate 2 l./hour for 3 hours). Trimethylsilane is obtained in a yield of 35%.

If, before bubbling through the hydrogen chloride, 10.1 g. of triethylamine are added, the yield is raised to 43%.

EXAMPLE 5

138 g. of triethylamine hydrochloride, 460 g. of hexamethylphosphotriamide and 24.3 g. of magnesium are introduced into a 2.1 flask. 108.6 g. of trimethylchlorosilane are added over the course of 45 minutes to the mixture heated to 75° C., and the temperature is then maintained at 75° C. for 9 hours. The trimethylsilane is carried away into the traps as in Example 1. The yield of trimethylsilane is 76.5%.

EXAMPLE 6

This experiment is carried out as in Example 5, but 120.5 g. of dimethyl-vinylchlorosilane are substituted for the trimethylchlorosilane. 20.7 g. of dimethyl-vinylsilane are obtained.

EXAMPLE 7

12.9 g. of dimethyldichlorosilane are reacted with 7.3 g. of magnesium, 38.3 g. of trimethylamine hydrochloride and 100 ml. of hexamethylphosphotriamide, at 75° C., in accordance with the procedure of Example 1. 4.5 g. of dimethylsilane are obtained, corresponding to a yield of 75% based on the chlorosilane employed.

EXAMPLE 8

This experiment is carried out as in Example 1, but substituting 19.3 g. of tripropylchlorosilane for the trimethylchlorosilane and recovering the tripropylsilane directly in a trap. The reaction is carried out at 70–75° C. in 2 hours. 4.7 g. of tripropylsilane are obtained.

EXAMPLE 9

This experiment is carried out as in Example 8 but replacing the tripropylchlorosilane by 16.7 g. of dimethyl-butoxychlorosilane. The reaction is carried out at 75° C., 7.26 g. of dimethyl-butoxysilane are obtained.

EXAMPLE 10

This experiment is carried out as in Example 8, adding 6 g. of triphenylchlorosilane to the reaction flask kept at 75° C. and containing 100 ml. of hexamethylphosphotriamide, 2.4 g. of magnesium and 19 g. of trimethylamine hydrochloride. 3.58 g. of triphenylsilane are recovered, corresponding to a yield of 69% based on the chlorosilane employed.

EXAMPLE 11

17.8 g. of aluminium, 71.5 g. of trimethylchlorosilane, 120.9 g. of triethylamine hydrochloride, 330 cm.$^3$ of hexamethylphosphotriamide and 0.3 g. of mercuric chloride are introduced into a 1 litre flask connected to a condenser, a bubbling bottle filled with water and a trap cooled to −80° C. The reagents are heated to a temperature of 100° C. for 13 hours and nitrogen is then bubbled through at this temperature at the rate of 5 l./hour for 3 hours 30 minutes. The nitrogen makes it possible to carry away the hydrogenosilane remaining in the trap. A fraction of 27.5 g. of a mixture containing 80.2% of trimethylsilane is thus collected. Fractional distillation of the mixture yields 20 g. of pure trimethylsilane.

We claim:

1. Process for the preparation of an oragnosilicon compound containing silicon bonded to hydrogen which comprises contacting in a hexaalkylphosphotriamide a chlorosilane of the formula $$R_{(4-n)}SiCl_n$$

with hydrogen chloride in the free state or combined in the form of ammonium chloride or an amine hydrochloride, in the presence of magnesium or aluminium, the chlorosilane being one in which $n$ is 1, 2 or 3, R repersents a straight or branched alkyl or alkenyl group, said alkyl or alkenyl group containing up to 6 carbon atoms, a cycloalkyl or cycloalkenyl group, said cycloalkyl or cycloalkenyl group containing 5 or 6 ring carbon atoms, a phenyl, alkylphenyl or phenylalkyl group, an alkoxy group of 1 to 6 carbon atoms, a cyclopentyloxy or cyclohexyloxy group, or a phenoxy group which is unsubstituted or substituted by straight or branched chain alkyl radicals of 1 to 6 carbon atoms each, said amine hydrochloride being a hydrochloride of an amine of the formula

in wnich the radicals $R_1$, $R_2$ and $R_3$, may independently represent a hydrogen atom or a straight or branched chain alkyl or alkenyl radical, said alkyl or alkenyl radical having up to 6 carbon atoms, a cycloaliphatic radical of 5 or 6 ring carbon atoms, a phenylalkyl or alkylphenyl radical or two of the radicals, together with the nitrogen atom, forming an azacycloaliphatic ring.

2. Process according to claim 1 wherein R represents at least one radical selected from methyl, propyl, vinyl, butoxy and phenyl.

3. Process according to claim 1 wherein a chlorosilane in which at least one R group represents methyl is heated with magnesium and a trialkyl amine in the presence of hexamethylphosphotriamide.

4. Process according to claim 1, in which the hexaalkylphosphotriamide has the formula:

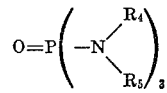

in which $R_4$ and $R_5$, which may be identical or different, represent straight or branched alkyl radicals of 1 to 4 carbon atoms each.

5. Process according to claim 4 in which the hexaalkylphosphotriamide is hexamethylphosphotriamide.

6. Process according to claim 1 in which the proportion of the hexaalkylphosphotriamide is 0.5 to 10 times the total weight of the reagents.

7. Process according to claim 1 in which the magnesium or aluminium is used at the rate of 0.5 to 10 atoms per atom of chlorine bonded to silicon.

8. Process according to claim 1 in which aluminium is used, activated by 0.1 to 2% by weight of mercuric chloride.

9. Process according to claim 1 in which the hydrogen chloride, whether in the free state or combined as ammonium chloride or an amine hydrochloride, is used at the rate of 1 to 10 molecules per chlorine atom bonded to silicon.

10. Process according to claim 1 in which the hydrogen chloride is used in the form of a trialkylamine hydrochloride in which each alkyl has 1 to 6 carbon atoms.

References Cited

UNITED STATES PATENTS 3,057,686  10/1962  Muetterties _____ 260—448.2 H
3,100,788  8/1963  Jenkner _____ 260—448.2 H TOBIAS E. LEVOW, Primary Examiner W. F. W. BELLAMY, Assistant Examiner U.S. Cl. X.R.

260—448.2 H